(12) United States Patent
Russell

(10) Patent No.: US 7,769,392 B2
(45) Date of Patent: Aug. 3, 2010

(54) METHOD AND SYSTEM FOR FORWARDING WIRELESS COMMUNICATIONS

(75) Inventor: Alicia Marie Russell, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1013 days.

(21) Appl. No.: 10/668,617

(22) Filed: Sep. 23, 2003

(65) Prior Publication Data

US 2005/0064855 A1 Mar. 24, 2005

(51) Int. Cl.
*H04Q 7/20* (2006.01)
(52) U.S. Cl. .................. 455/456.1; 455/417; 455/414.1; 379/212.01; 379/211.02; 370/259
(58) Field of Classification Search .................. 455/445, 455/456.1, 461, 459, 417, 414.1; 370/259; 379/212.01, 211.02
See application file for complete search history.

(56) References Cited

U.S. PATENT DOCUMENTS

| | | | |
|---|---|---|---|
| 4,275,385 A | 6/1981 | White | |
| 4,752,951 A | 6/1988 | Konneker | |
| 4,768,224 A * | 8/1988 | Waldman ............... | 379/207.16 |
| 4,932,050 A | 6/1990 | Davidson et al. | |
| 4,935,927 A | 6/1990 | Kaewell, Jr. et al. | |
| 4,989,230 A | 1/1991 | Gillig et al. | |
| 5,127,042 A | 6/1992 | Gillig et al. | |
| 5,142,695 A | 8/1992 | Roberts et al. | |
| 5,155,759 A | 10/1992 | Saegusa et al. | |
| 5,218,716 A | 6/1993 | Comroe et al. | |
| 5,229,701 A | 7/1993 | Leman et al. | |
| 5,247,567 A | 9/1993 | Hirano | |

(Continued)

FOREIGN PATENT DOCUMENTS

EP 0 671859 9/1995

(Continued)

OTHER PUBLICATIONS

Verb Exchange Service—Tagline—One number gets me everywhere; www.verbx.com/srv/service_tagline.html; 1 page, May 16, 2003.

(Continued)

*Primary Examiner*—Lester Kincaid
*Assistant Examiner*—Charles Shedrick
(74) *Attorney, Agent, or Firm*—Toler Law Group

(57) ABSTRACT

In a particular embodiment, a system is provided that includes a wireless beacon to provide wireless data communication with a mobile telephone to detect a location of the mobile telephone within a wireless detection area provided by a wireless beacon, and a communication interface to send a call forwarding message to a cellular switch. The call forwarding message provides an instruction to route future calls destined for the mobile telephone to an alternate network address. In another embodiment, a method of selecting a destination telephone is disclosed that includes detecting a location of a mobile telephone within a wireless detection area provided by a wireless beacon, and sending a call forwarding message to a wide area switch having a communication path targeted to the mobile telephone. The call forwarding message provides an instruction to route future calls destined for the mobile telephone to an alternative communication path.

22 Claims, 6 Drawing Sheets

U.S. PATENT DOCUMENTS

| | | | |
|---|---|---|---|
| 5,260,988 A | 11/1993 | Schellinger et al. | |
| 5,353,331 A | 10/1994 | Emery et al. | |
| 5,367,558 A | 11/1994 | Gillig et al. | |
| 5,375,161 A | 12/1994 | Fuller et al. | |
| 5,442,680 A | 8/1995 | Schellinger et al. | |
| 5,469,496 A | 11/1995 | Emery et al. | |
| 5,469,498 A | 11/1995 | Emery et al. | |
| 5,515,366 A | 5/1996 | Chieu et al. | |
| 5,550,895 A | 8/1996 | Burson et al. | |
| 5,553,117 A | 9/1996 | Peterson et al. | |
| 5,603,054 A | 2/1997 | Theimer et al. | |
| 5,636,243 A | 6/1997 | Tanaka | |
| 5,644,620 A | 7/1997 | Shimura | |
| 5,673,308 A | 9/1997 | Akhavan | |
| 5,745,850 A | 4/1998 | Aldermeshian et al. | |
| 5,748,147 A | 5/1998 | Bickley et al. | |
| 5,842,112 A | 11/1998 | Fuller et al. | |
| 5,950,133 A | 9/1999 | Bledsoe | |
| 5,995,839 A | 11/1999 | Coursey et al. | |
| 6,041,229 A | 3/2000 | Turner | |
| 6,069,588 A | 5/2000 | O'Neill, Jr. | |
| 6,073,031 A | 6/2000 | Helstab et al. | |
| 6,091,949 A | 7/2000 | Sanchez | |
| 6,130,938 A | 10/2000 | Erb | |
| 6,185,427 B1 | 2/2001 | Krasner et al. | |
| 6,188,888 B1* | 2/2001 | Bartle et al. | 455/417 |
| 6,201,950 B1 | 3/2001 | Fuller et al. | |
| 6,208,854 B1 | 3/2001 | Roberts et al. | |
| 6,240,297 B1 | 5/2001 | Jadoul | |
| 6,301,350 B1 | 10/2001 | Henningson et al. | |
| 6,320,534 B1 | 11/2001 | Goss | |
| 6,332,082 B1 | 12/2001 | Fuller et al. | |
| 6,362,778 B2 | 3/2002 | Neher | |
| 6,373,817 B1 | 4/2002 | Kung et al. | |
| 6,389,117 B1 | 5/2002 | Gross et al. | |
| 6,424,840 B1 | 7/2002 | Fitch et al. | |
| 6,480,593 B1 | 11/2002 | Munday et al. | |
| 6,484,027 B1 | 11/2002 | Mauney et al. | |
| 6,505,055 B1 | 1/2003 | Kahn et al. | |
| 6,516,060 B1 | 2/2003 | Foladare et al. | |
| 6,574,213 B1 | 6/2003 | Anandakumar et al. | |
| 6,574,470 B1* | 6/2003 | Chow et al. | 455/417 |
| 6,587,475 B1 | 7/2003 | Przygienda | |
| 6,587,683 B1 | 7/2003 | Chow et al. | |
| 6,600,734 B1 | 7/2003 | Gernert et al. | |
| 6,609,006 B1* | 8/2003 | Mori | 455/466 |
| 6,611,681 B2 | 8/2003 | Henderson | |
| 6,614,206 B1 | 9/2003 | Wong et al. | |
| 6,614,784 B1 | 9/2003 | Glitho et al. | |
| 6,625,423 B1 | 9/2003 | Wang | |
| 6,650,088 B1 | 11/2003 | Webb et al. | |
| 6,704,580 B1 | 3/2004 | Fintel | |
| 6,735,432 B1 | 5/2004 | Jarett et al. | |
| 6,766,175 B2 | 7/2004 | Uchiyama | |
| 6,856,806 B1* | 2/2005 | Bosik et al. | 455/445 |
| 6,892,083 B2 | 5/2005 | Shostak | |
| 6,975,713 B1 | 12/2005 | Smith et al. | |
| 6,978,154 B1 | 12/2005 | Ospalak et al. | |
| 6,978,163 B2 | 12/2005 | Dyer et al. | |
| 2001/0014599 A1 | 8/2001 | Henderson | |
| 2001/0019955 A1 | 9/2001 | Henderson | |
| 2002/0029258 A1 | 3/2002 | Mousseau et al. | |
| 2002/0111190 A1 | 8/2002 | Harrison et al. | |
| 2002/0115480 A1 | 8/2002 | Huang | |
| 2002/0119800 A1 | 8/2002 | Haggers et al. | |
| 2002/0137472 A1 | 9/2002 | Quinn et al. | |
| 2002/0181442 A1 | 12/2002 | Rajani | |
| 2003/0003900 A1 | 1/2003 | Goss et al. | |
| 2003/0039242 A1 | 2/2003 | Moore, Jr. | |
| 2003/0050051 A1 | 3/2003 | Vilander | |
| 2003/0073411 A1 | 4/2003 | Meade, II | |
| 2003/0092451 A1* | 5/2003 | Holloway et al. | 455/461 |
| 2003/0125075 A1 | 7/2003 | Klovborg | |
| 2003/0133421 A1 | 7/2003 | Sundar et al. | |
| 2003/0181202 A1 | 9/2003 | Link, III et al. | |
| 2004/0018774 A1 | 1/2004 | Long et al. | |
| 2004/0023640 A1* | 2/2004 | Ballai | 455/411 |
| 2004/0032484 A1 | 2/2004 | Halttunen | |
| 2004/0066776 A1 | 4/2004 | Ishidoshiro | |
| 2004/0072544 A1 | 4/2004 | Alexis | |
| 2004/0116073 A1 | 6/2004 | Mauney et al. | |
| 2004/0120492 A1 | 6/2004 | Lew et al. | |
| 2004/0127241 A1 | 7/2004 | Shostak | |
| 2004/0156491 A1 | 8/2004 | Reding et al. | |
| 2004/0203374 A1 | 10/2004 | Zilliacus | |
| 2004/0204056 A1 | 10/2004 | Phelps, III | |
| 2004/0208297 A1 | 10/2004 | Valentine | |
| 2004/0213212 A1 | 10/2004 | Reding et al. | |
| 2004/0218575 A1 | 11/2004 | Ibe et al. | |
| 2004/0266425 A1 | 12/2004 | Gonsalves et al. | |
| 2005/0020236 A1 | 1/2005 | Mauney et al. | |
| 2005/0032475 A1 | 2/2005 | Mauney et al. | |
| 2005/0054335 A1 | 3/2005 | Pearson et al. | |
| 2005/0063360 A1 | 3/2005 | Lowmaster | |
| 2005/0063528 A1 | 3/2005 | Pearson et al. | |
| 2005/0064853 A1 | 3/2005 | Radpour | |
| 2005/0064855 A1 | 3/2005 | Russell | |
| 2005/0096024 A1 | 5/2005 | Bicker et al. | |
| 2005/0210101 A1 | 9/2005 | Janik | |
| 2005/0215243 A1 | 9/2005 | Black et al. | |
| 2005/0273781 A1 | 12/2005 | Nakamura et al. | |
| 2005/0277431 A1 | 12/2005 | White | |
| 2005/0282582 A1 | 12/2005 | Slotznick | |
| 2006/0003806 A1 | 1/2006 | Weber et al. | |
| 2006/0031587 A1 | 2/2006 | Paterson et al. | |

FOREIGN PATENT DOCUMENTS

| | | |
|---|---|---|
| EP | 0 713345 | 5/1996 |
| GB | 2 305078 | 3/1997 |
| JP | 8-163646 | 6/1996 |
| JP | 8-172673 | 7/1996 |
| JP | 8-294168 | 11/1996 |
| JP | 8-294170 | 11/1996 |
| JP | 8-317468 | 11/1996 |
| JP | 8-322087 | 12/1996 |
| JP | 9-37345 | 2/1997 |
| JP | 9-55981 | 2/1997 |
| JP | 9-84117 | 3/1997 |
| JP | 9-98476 | 4/1997 |
| WO | WO 94/05101 | 3/1994 |

OTHER PUBLICATIONS

Zbar, Jeff "Follow-me phone service keeps remote worker tethered to clients, co-workers"; NetworkWorldFusion; www.nwfusion.com/net.worker/columnists/2002/0826zbar.html; 3 pages, May 16, 2003.

www.officespace.com/services.asp; Follow-me phone; 1 page, May 16, 2003.

Callagenix "call diversion service"; www.callagenix.com/services/diversion.html; 3 pages, May 16, 2003.

Gupta, Puneet, "Short Message Service: What, How and Where?"; Wireless Developer Network; www.wirelessdevnet.com/channels/sms/features/sms.html; 7 pages, Jul. 8, 2003.

Webopedia; "Short Message Service"; www.webopedia.com/TERM/S/Short_ Message_Service.html; 3 pages, Jul. 8, 2003.

"Cellular Phone and Roaming Service"; www.members.tripod.com/peacecraft/infomining/cellphon.htm; 19 pages, Jul. 8, 2003.

Charney, Ben; "VoIP Maker Plans Cell Hybrid"; http://zdnet.com, News Software; Oct. 3, 2003. pp. 1-3.

International Search Report and Written Opinion of the International Searching Authority for PCT/US04/34239; Feb. 17, 2005; 10 pages.

International Search Report and Written Opinion of the International Searching Authority for PCT/US05/16449; Apr. 10, 2006; 11 pages.

International Search Report and Written Opinion of the International Searching Authority for PCT/US04/16017; Aug. 16, 2005; 7 pages.
International Search Report and Written Opinion of the International Searching Authority for PCT/US04/28260; Sep. 30, 2005; 10 pages.
International Search Report and Written Opinion of the International Searching Authority for PCT/US2005/016449; Jun. 15, 2006; 3 pages.
English Language Abstract of JP No. 9-98476.
English Language Abstract of JP No. 9-84117.
English Language Abstract of JP No. 9-55981.
English Language Abstract of JP No. 9-37345.
English Language Abstract of JP No. 8-322087.
English Language Abstract of JP No. 8-317468.
English Language Abstract of JP No. 8-294170.
English Language Abstract of JP No. 8-294168.
English Language Abstract of JP No. 8-172673.
English Language Abstract of JP No. 8-163646.
Bluetooth Consortium, "Specification of the Bluetooth System: Profiles"; Dec. 1, 1999.
Haartsen, J., "Bluetooth: A New Radio Interface Providing Ubiquitous Connectivity", IEEE, pp. 107-111, Dec. 2000.
Schneiderman, R., "Bluetooth's Slow Down", IEEE, pp. 61-65, Dec. 1999.

* cited by examiner

METHOD AND SYSTEM FOR FORWARDING WIRELESS COMMUNICATIONS

BACKGROUND

1. Field of the Invention

The present invention relates generally to wireless communication, and specifically to call forwarding requests for wireless communications.

2. Description of the Related Art

Network integration applications supporting call routing between wireless and wireline telephones for single end-users typically fall into one or more service capabilities such as call forwarding and Find Me-Follow Me services. The Find Me-Follow Me service provides end-users with a capability to manage communications by allowing them to determine how, when, and by whom they can be reached.

Find Me-Follow Me service applications enable users to define profiles based on a wide variety of parameters via a telephone or a Web-based interface. Typically, users select a combination of different phone numbers in a user defined search order for delivery of calls. For example, users who are going to be away from the office can set preferences that enable the system to first transfer important calls to a mobile phone number, then a pager, and then home if no one answers at the office. Generally, if no pick up occurs at the final destination, the caller can be transferred to voicemail.

Multiple call-diversion lists or profiles generally require a user to specify numerous destination numbers. Profiles may be set up by a service system administrator, and are then activated by the telephone user. A Follow Me type service typically has an associated PIN code or Personal Number (access number) profile. With a PIN code, a user dials their access number and lets it ring until it picks up, then enters their PIN code and gains access to a menu, where the user can change their callback number. When someone calls a telephone that has a Personal Number profile enabled, the profile selected predetermines which numbers will be called and in which order. For example, one profile could try a user's office telephone, and if no answer, a user's home phone, then cell phone, and if still no answer, the call could be sent to the user's voice mail.

Find Me-Follow Me applications often require time-consuming and inconvenient initial multiple number profiles to be set up, as well as periodic input from a user to change their callback number. Accordingly, there is a need for an improved method and system for forwarding wireless communications.

SUMMARY

In a particular embodiment, a system is provided that includes a wireless beacon to provide wireless data communication with a mobile telephone to detect a location of the mobile telephone within a wireless detection area provided by a wireless beacon, and a communication interface to send a call forwarding message to a cellular switch. The call forwarding message provides an instruction to route future calls destined for the mobile telephone to an alternate network address.

In another embodiment, a method of selecting a destination telephone is disclosed that includes detecting a location of a mobile telephone within a wireless detection area provided by a wireless beacon, and sending a call forwarding message to a wide area switch having a communication path targeted to the mobile telephone. The call forwarding message provides an instruction to route future calls destined for the mobile telephone to an alternative communication path.

In a further embodiment, a method is disclosed for receiving an identifier from a source at a wireless mobile communication device over a first wireless connection, and communicating a request to a wireless switch to forward voice communications to the wireless mobile communication device to an alternate communication device different than the wireless communication device in response to receiving the identifier. The source is proximal to the wireless mobile communication device. The method includes receiving a wireless communication over a second wireless connection having a protocol other than the first wireless connection.

In another embodiment, a system is disclosed that includes a wireless communication device comprising a first receiver to facilitate two-way telephone conversations using a first wireless protocol, a second receiver to facilitate monitoring of wireless information using a second wireless protocol, and a first control module to provide a request to forward an incoming communication request to an alternate communication device proximal to a transmitter. The transmitter periodically transmits an identifier using the second wireless protocol within a limited area range. The wireless communication device is accessible by a specific phone number.

BRIEF DESCRIPTION OF THE DRAWINGS

Specific embodiments are shown and described with respect to the drawings presented herein. It will be appreciated that for simplicity and clarity of illustration, elements illustrated in the Figures have not necessarily been drawn to scale. For example, the dimensions of some of the elements are exaggerated relative to other elements for clarity. The use of the same reference symbols in different drawings indicates similar or identical items, and wherein.

DETAILED DESCRIPTION OF THE DRAWINGS

The present disclosure is generally directed to the provision of an integrated wireless and wireline communications system and methods thereof. The system and methods disclosed herein offer users convenience and flexibility by providing wireless location based routing to an alternate telephone destination such as a landline (wireline) telephone termination. The location based routing is provided automatically simply by placing the mobile telephone handset in proximity to a detector located near the alternate telephone destination. In addition, other conventional service-rich features such as distinctive ring, caller identification/privacy management and a common voicemail service for a user's wireless and wireline telephones are also possible when utilizing the system and methods disclosed herein.

In further embodiment, a method is disclosed for receiving an identifier from a source at a wireless mobile communication device over the first wireless connection, and communicating a request to a wireless switch to forward voice communications destined for the mobile telephone number to an alternate network via an alternative phone number (the call forwarding number) in response to receiving the identifier. Both the mobile telephone number and the alternate landline number may deliver calls to the same physical communications device if it is a multi-mode phone that can operate in both the wide area mobile network and the landline network. An example would be a dual-mode GSM-cordless phone. The source is proximal to the wireless mobile communications device. The method includes receiving a wireless communication over a second wireless connection having a protocol other than the first wireless connection. The method further includes determining when to withdraw the request to forward voice communication calls.

Figure 1:
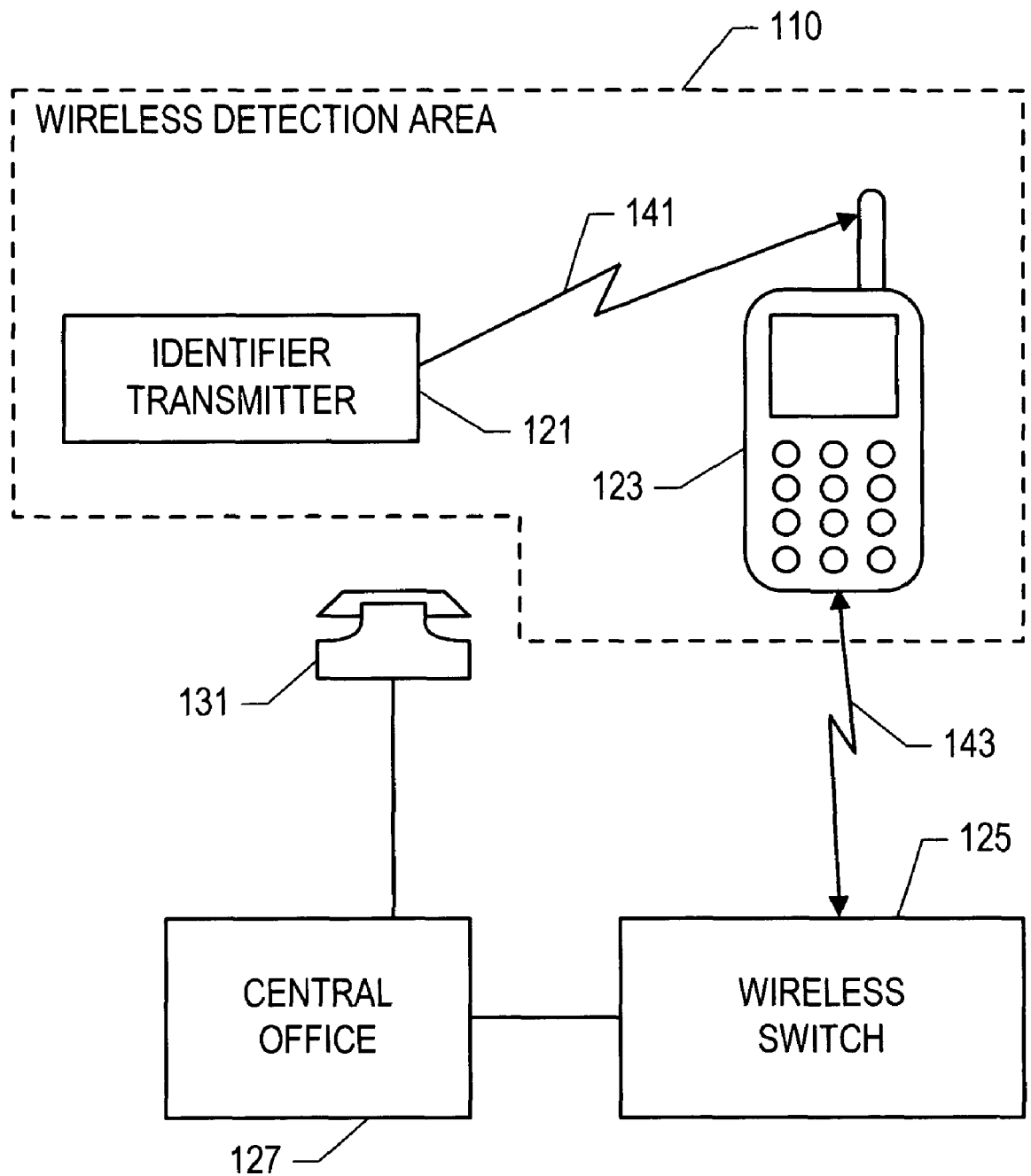
FIG. 1 is a block diagram illustrating an embodiment of an integrated wireless and wireline communication system.

Specifically, FIG. 1 illustrates, in block diagram form, an embodiment of an integrated wireless/wireline communication system. The integrated wireless/wireline communications system includes a mobile telephone 123 and an identifier transmitter 121 within a wireless detection area 110. The wireless detection area 110 may be provided by a wireless beacon that incorporates the identifier transmitter 121. A communication interface may be located inside the mobile telephone 123.

The system further includes a wireless switch 125 such as a cellular wide area switch, which communicates with an alternate telephone destination 131 via an intermediary switch in a telephone service provider central office 127. The identifier transmitter 121 communicates with the mobile telephone 123 via transmission signal 141. The wireless switch 125 communicates with the mobile telephone 123 via a signal 143. In an embodiment, the alternate telephone destination 131 is a telephone number correlated with a landline telephone located in proximity to the identifier transmitter 121 and the mobile telephone 123. The term proximity as used herein identifies the physical placement of the mobile telephone 123 within a coverage area 110 of the wireless beacon device or identifier transmitter 121. The wireless beacon device or identifier transmitter 121 may indicate proximity of the mobile communication device 123 to a landline telephone.

In one embodiment, the transmission signal 141 from the identifier transmitter 121 utilizes a wireless data protocol. The wireless data protocol may be the IEEE 802.11 standard wireless protocol, the Bluetooth standard protocol, or other wireless data protocols employed in the telecommunications industry. Generally, the signal 143 between the mobile telephone 123 and the wireless switch 125 will comprise a wireless data message protocol such as the Short Message Service (SMS) protocol. The wireless data message may be carried over various packet channels using protocols such as a Global System for Mobile communication (GSM) control channel, General Packet Radio Service (GPRS), universal Mobile Telecommunications Systems (UMTS) data, and CDMA2000/CDMAOne, as are known in the art.

In one exemplary embodiment, a wireless telephone 123 may have Bluetooth functionality such as a class 3 type communication circuitry. A wireless beacon or identifier transmitter 121 may transmit a unique code using wireless data techniques, such as Bluetooth class 1 type communication. When in proximity to the wireless beacon 121, the wireless telephone 123 may receive the unique code from the wireless beacon 121. A module within the wireless telephone 123 determines which network address is associated with the wireless beacon 121. The network address may, for example, be a landline telephone number or an Internet Protocol (IP) address for Phone Over IP calling. Alternately, the network address may be transmitted as part of the unique code associated with the wireless beacon 121. The wireless telephone 123 may then send an SMS message via a wireless channel to facilitate call forwarding. Once the wireless telephone 123 leaves the coverage area 110 of the wireless beacon 121, the wireless telephone 123 may send a cancel call forwarding signal.

Utilizing multiple beacons, calls to a wireless telephone 123 may be forwarded to associated landline phones when in various locations. For example, a user may have one wireless beacon located at home and another at work. Each wireless beacon may have a different unique identifier or may transmit a different forwarding address. The wireless phone may selectively activate and deactivate call forwarding by sending messages that include a network address associated the identified beacon.

The wireless beacon may also be used in conjunction with multiple wireless phones. Each phone may activate and deactivate call forwarding as it enters and leaves the wireless beacon coverage area. In some embodiments, each phone may activate a distinctive ring utilized when a call is forwarded from such phone to the alternate landline telephone. In other embodiments, each of the multiple wireless beacons may communicate additional coding to identify the network address. In further embodiments, wireless phones may selectively activate call forwarding when in proximity to a wireless beacon. If the wireless phone recognizes the identity of the wireless beacon, the wireless phone may activate and deactivate call forwarding when entering and leaving the wireless beacon coverage area. However, if the identity of the wireless beacon is not recognized or if color coding does not match the value expected by the wireless phone, the wireless phone may ignore the wireless beacon. In such an example, a wireless telephone may enter an area covered by multiple wireless beacons and only respond to a single designated beacon.

To ensure that only authorized mobile devices may initiate call forwarding into the alternate network designated by the beacon, the beacon signal may be encrypted so that only mobile devices with the correct public key can decrypt the signal and read the beacon identifier. Various methods exist for provisioning the beacon identifier and public key within the mobile device. One approach would be to run a short activation procedure between the beacon and the mobile phone using the first communications protocol. Further protection can be added so that a user login password is required to begin the activation procedure so that only the authorized user of the beacon may activate new mobile devices.

The illustrated embodiment of FIG. 1 depicts the mobile communication device 123 and a landline telephone 131. However, the concept may be generalized to call forwarding from one network address to a network address associated with a different network. In another alternate embodiment, a multi-modal device may communicate using different networks depending on location such as a dual-mode GSM-cordless phone.

Figure 2:
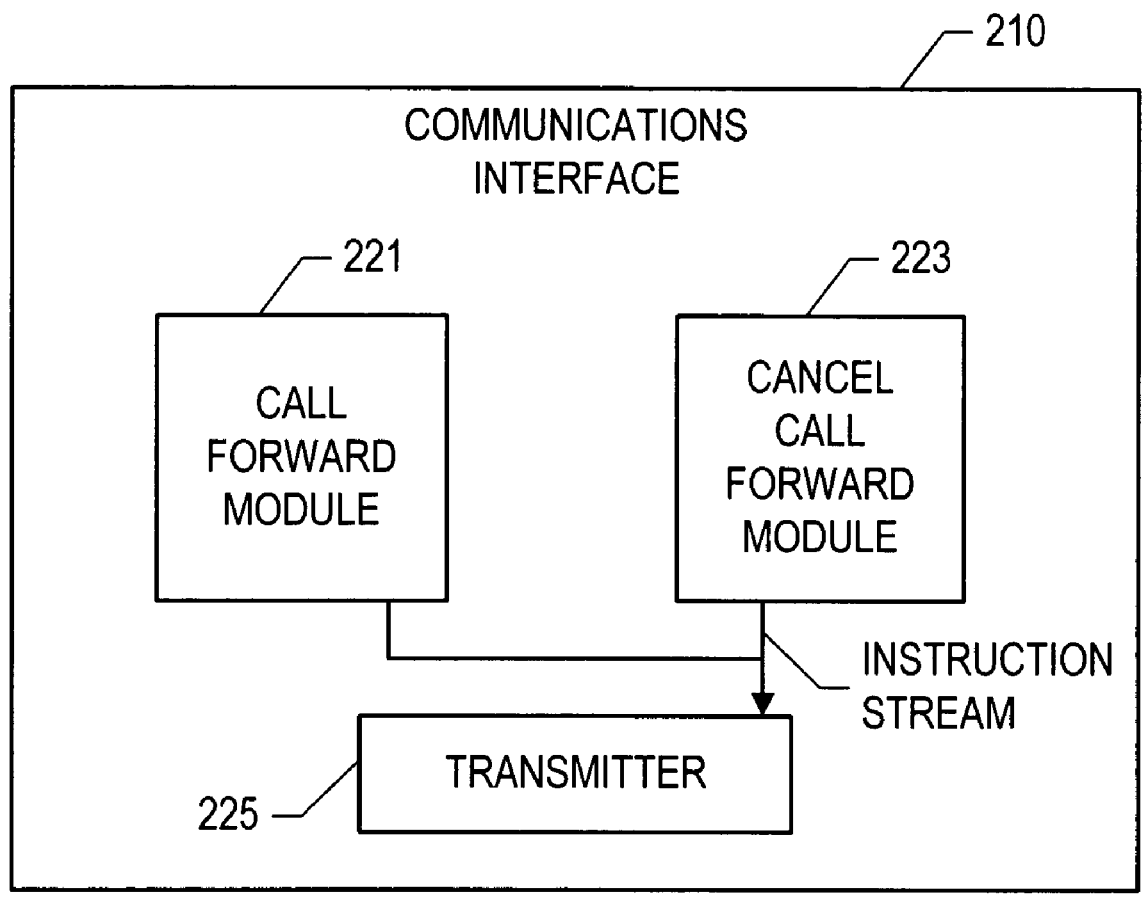
FIG. 2 is a block diagram illustrating a communications interface for use in connection with the communication system of FIG. 1.

FIG. 2 is a block diagram illustrating a communications interface 210. Communications interface 210 may be located inside the mobile wireless communication device 123, e.g., a cellular phone accessible by a specific phone number in FIG. 1. In one embodiment, the wireless communication device has a first receiver to facilitate two-way telephone conversations using a first wireless protocol, and a second receiver to facilitate monitoring wireless information using a second wireless protocol. Communications interface 210 comprises a first control module, call forwarding module 221, and a second control module, cancel call forwarding module 223, which send their respective instruction streams to a transmitter 225. Transmitter 225 transmits an identifier using a first wireless protocol such as those packet channel protocols listed above and a data message protocol such as SMS messages.

Call forwarding module 221 receives a request to forward incoming communications requests to an alternate communication device proximal to a transmitter 215. Cancel call forwarding module 223 cancels a prior call forwarding instruction to an alternate communication device by providing a request to provide communication requests directly to the wireless communication device 123.

In one exemplary embodiment, the modules 221 and 223 are modules in a wireless phone. For example, the call forwarding module 221 may identify the wireless beacon and send a call forwarding message associated with a phone number or network address associated with the wireless beacon. Multiple beacons with different identifiers may then be used to transfer calls depending on the proximity of the phone. For example, a user may have a beacon with one identifier at home and a second beacon with a different identifier at the office. The module 221 may include a look up table to determine the appropriate forward to number or the number may be included as part of the beacon identifier.

In such an embodiment, more than one wireless phone may utilize the beacon in conjunction with either the call forwarding or the cancel call forwarding modules stored on each of the phones. Each of the wireless phones may initiate call forwarding to the same landline phone. In some embodiments, distinct rings may be implemented for calls associated with differing wireless phones.

Figure 3:
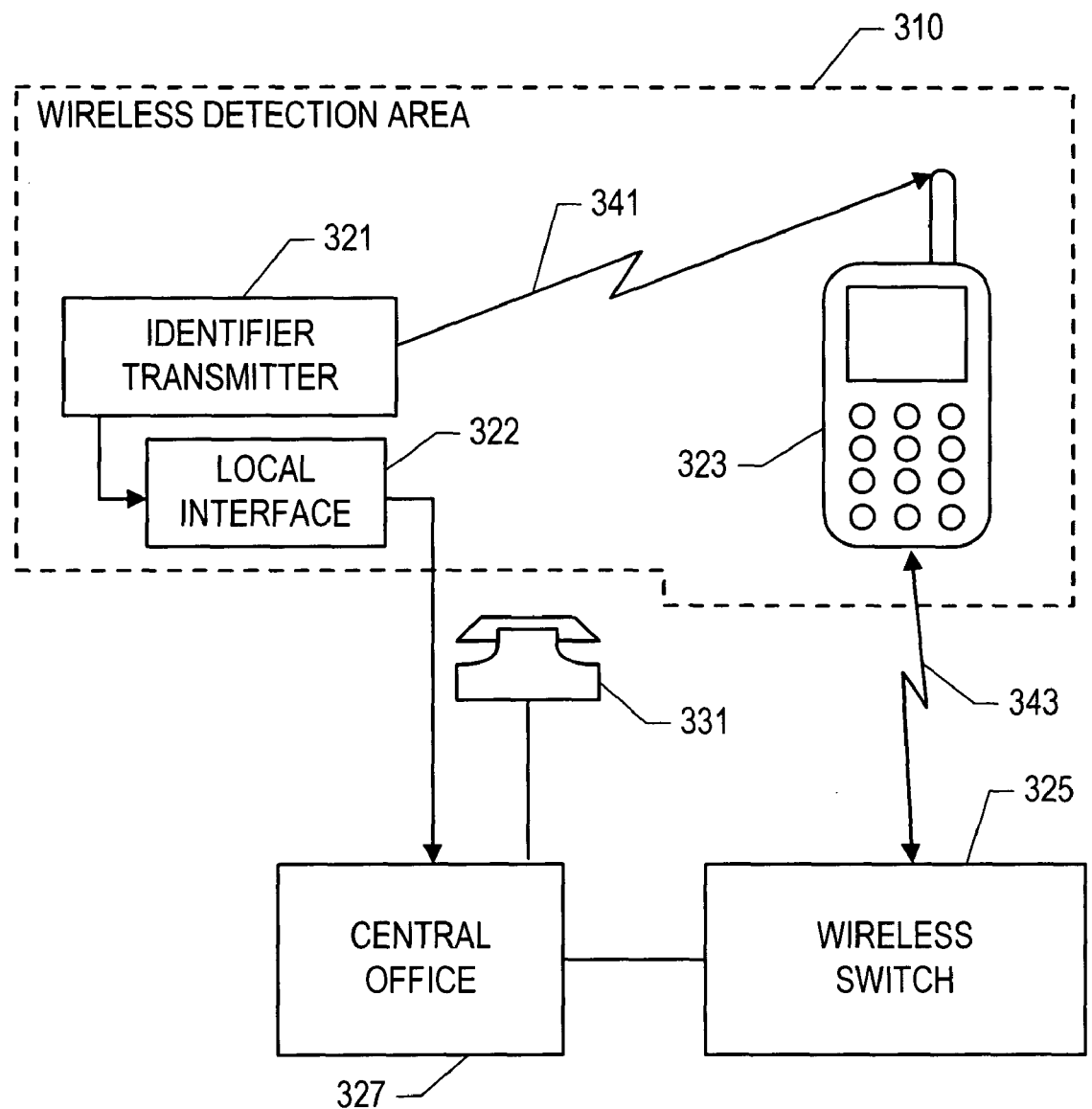
FIG. 3 is a block diagram illustrating an embodiment of an integrated wireless and wireline communication system.

FIG. 3 illustrates, in block diagram form, an embodiment of an integrated wireless/wireline communication system. The integrated wireless/wireline communications system includes a mobile telephone 323 and an identifier transmitter 321 within a wireless detection area 310. The wireless detection area 310 may be provided by a wireless beacon that incorporates the identifier transmitter 321. The integrated wireless/wireline communications system further includes a wireless switch 325, which communicates with an alternate telephone destination 331 via an intermediary switch in a telephone service provider central office 327. The identifier transmitter 321 communicates with the mobile telephone 323 via transmission signal 341. The wireless switch 325 communicates with the mobile telephone 323 via a signal 343. The identifier transmitter 321 is connected to the central office 327 via a local interface 322.

Figure 4:
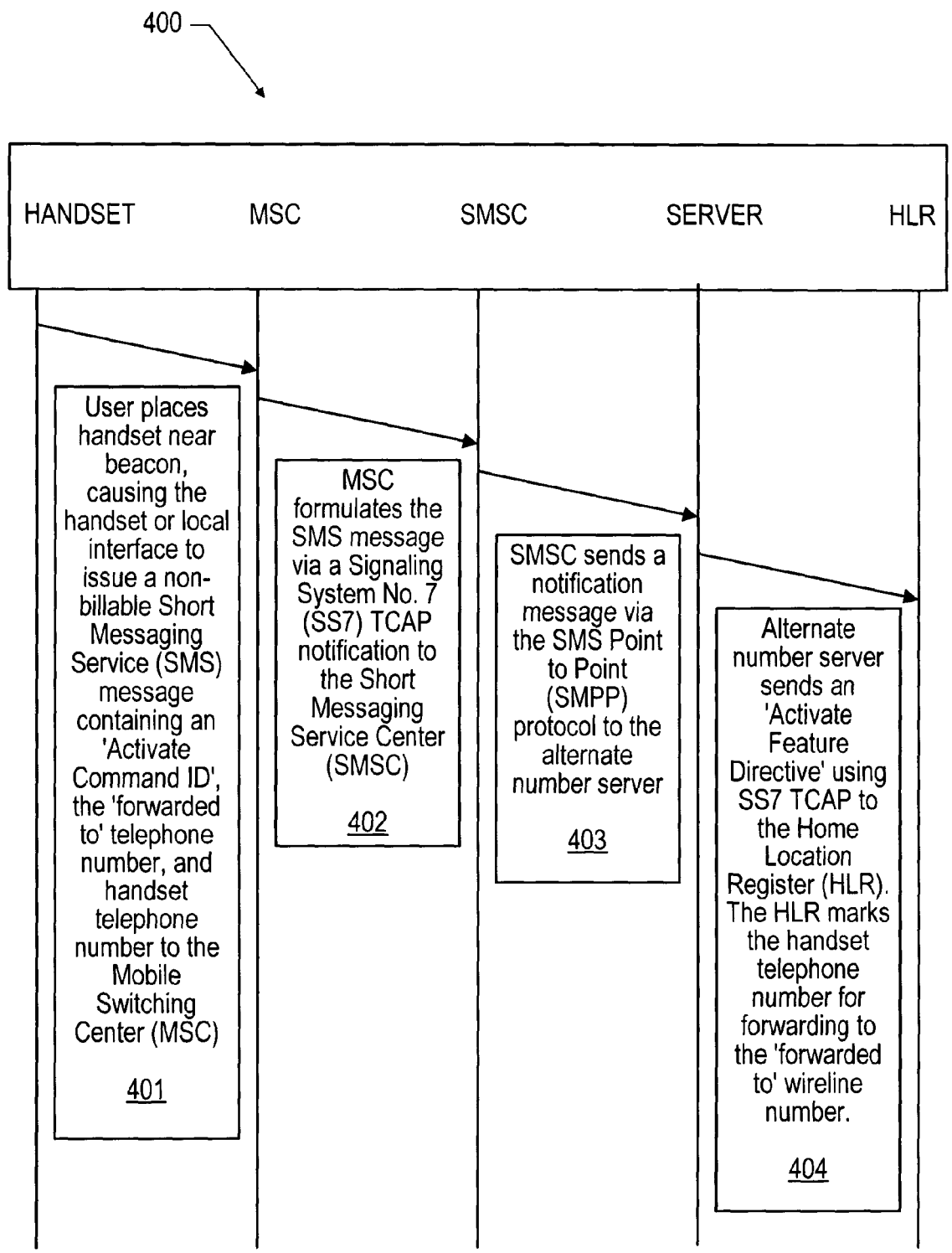
FIG. 4 is a sequence flow diagram illustrating feature activation for an integrated wireless and wireline communication system.

FIG. 4 is a sequence flow diagram illustrating feature activation for an integrated wireless and wireline communication system. The example provided in FIG. 4 illustrates a system 400 containing a handset, i.e., a mobile phone or local interface, a mobile switching center (MSC), a short messaging service center (SMSC), an alternate number server, and a home location register (HLR). In step 401, a user places their handset near a wireless beacon, which causes the handset to issue a non-billable short messaging service (SMS) message containing an 'Active Command ID,' the 'forwarded to' telephone number, and the handset telephone number to the MSC. The MSC formulates the SMS message via a signaling system No. 7 (SS7) TCAP notification to the SMSC, in step 402.

In step 403, the SMSC then sends a notification message via the Short Message Point to Point (SMPP) protocol to the alternate number server. The alternate number server, in step 404, sends an 'Activate Feature Directive' using SS7 TCAP to the HLR. The HLR marks the handset telephone number for forwarding to the 'forwarded to' number, such as to a proximate wireline telephone number.

Figure 5:
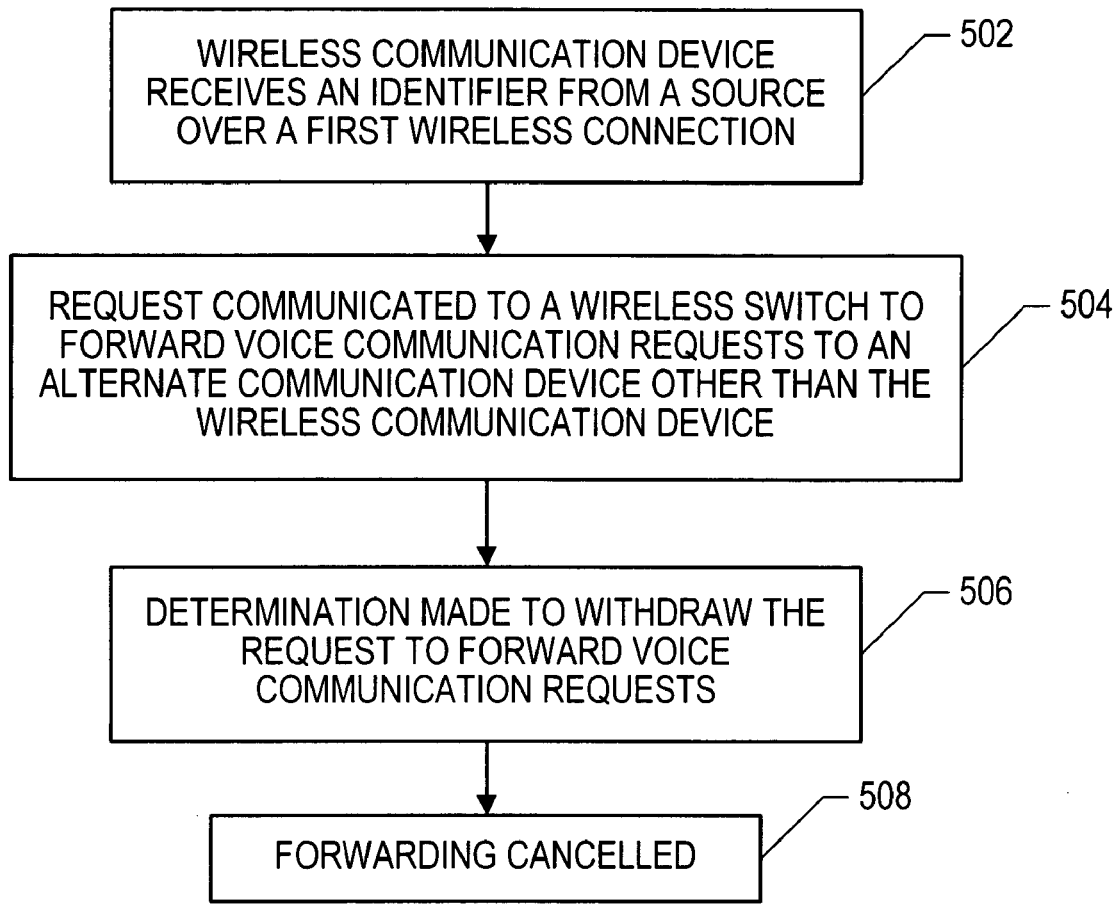
FIG. 5 is a flow diagram of a method for integrating wireless communications devices and alternate communication devices.

FIG. 5 is a flow diagram of a method for integrating wireless communications devices and alternate communication devices. In step 502, a wireless mobile communication device, which may be a cellular phone, a pager, a personal digital assistant (PDA), or other mobile communication device, receives an identifier from a source, such as a wireless beacon, over a first wireless connection. In an embodiment, the source is proximal to the wireless mobile communication device. The first wireless connection may utilize the IEEE 802.11 or Bluetooth wireless standards.

In step 504, a call forwarding request is automatically communicated to a wireless switch, e.g., a cellular switch, to forward voice communication requests to an alternate communication device in response to receiving the identifier of step 502. The request to the wireless switch may be made using a second wireless protocol, such as SMS over a GSM channel. The alternate communication device is different from the wireless communication device, and may be a wireline (landline) telephone located proximal to the source and the wireless communications device. In a particular embodiment, the wireless mobile communication device receives a wireless communication having a different protocol than the first wireless communication. In a particular embodiment, the identifier may be a user selected unique radio frequency identification (RFID).

In particular embodiments, the wireless mobile communication device may communicate with the wireless switch via non-voice data messaging such as the short message services (SMS) protocol.

Once steps 502 and 504 have been carried out, incoming calls destined for the wireless mobile communication device are forwarded to the alternate communication device until a determination has been made to withdraw the request for call forwarding to the alternate communication device, as in step 506. In an embodiment, the call forward request is withdrawn when the wireless mobile communication device no longer receives the identifier (e.g. where the mobile phone is moved outside the range of the beacon). In another embodiment, the call forwarding request is withdrawn in response to a user action. A user action can be a key sequence entered using the keypad of the wireless mobile communication device, or a voice request. In step 508 forwarding has been cancelled, and incoming communication requests are again directed to the wireless mobile communication device.

Figure 6:
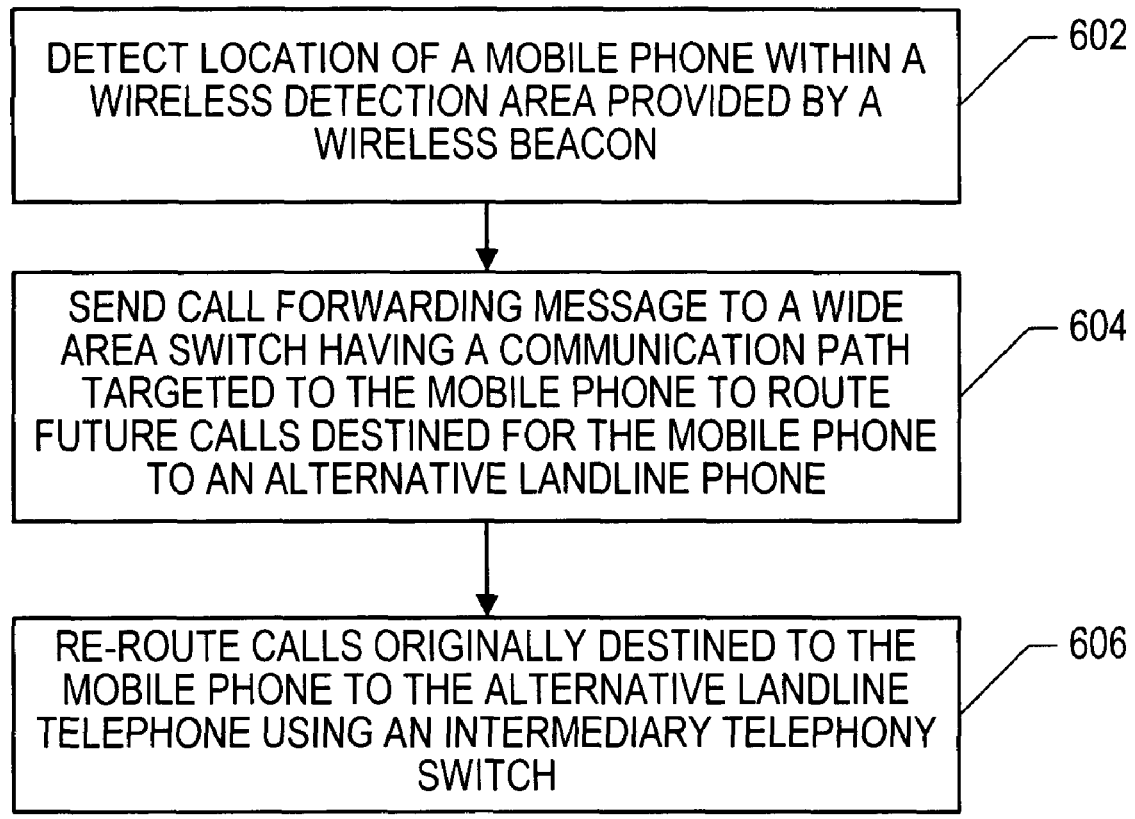
FIG. 6 is a flow diagram of a method for utilizing wireless data communications to send routing messages to an alternate telephony destination.

FIG. 6 is a flow diagram of a method for selecting a destination telephone utilizing wireless data communications to send routing messages to an alternate telephony destination. In step 602, detection of the location of a mobile telephone within the wireless detection area provided by a wireless beacon is conducted, When detected, a call forwarding message is sent to a wide area switch (e.g., a cellular switch) having a wireless communication path targeted to the mobile telephone, as in step 604. The call forwarding message provides an instruction to route future calls destined for the mobile telephone to an alternative communication path. In a particular embodiment, the alternative communication path is a landline telephone number. The landline telephone number is associated with a landline connection to a landline telephone located within the same residence as the wireless beacon.

Referring to step 606, calls originally destined to the mobile telephone are re-routed using an intermediary telephone switch, i.e., a switch located in a central office such as central office 127, 327. Re-routing continues unless cancelled by a user action, or by moving the mobile telephone outside of the wireless detection area provided by the wireless beacon.

In a particular embodiment, detecting the location of the mobile telephone is based upon communication using a wireless data protocol, which may be compliant with an IEEE 802.11 standard, or a Bluetooth standard. The call forwarding message of step 504 may be communicated to the wide area switch using a wireless data message protocol such as SMS via channels using protocols such as GSM, GPRS, CDMA, or UMTS.

In various embodiment, the wireless phone or wireless communication device may take various forms including personal digital assistants with built in communications circuitries, wireless telephones, cellular telephones, mobile telephones, and other wireless devices.

The methods and system described herein provide for an adaptable implementation. Although certain embodiments have been described using specific examples, it will be apparent to those skilled in the art that the invention is not limited to these few examples. Additionally, various types of wireless transceivers, transmitters, receivers, and protocols are currently available which could be suitable for use in employing the methods as taught herein. Note also, that although certain illustrative embodiments have been shown and described in detail herein, along with certain variants thereof, many other varied embodiments may be constructed by those skilled in the art. The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A system comprising: a wireless beacon to provide wireless data communication with a mobile telephone to detect a location of the mobile telephone within a wireless detection area provided by the wireless beacon; and a communication interface to selectively send a call forwarding message to a cellular switch based on an evaluation of a value received from the wireless beacon, the call forwarding message to provide an instruction to route future calls destined for the mobile telephone to an alternate network address; wherein selectively sending a call forwarding message based on an evaluation of a value received from the wireless beacon comprises comparing the value received from the wireless beacon to a look up table containing alternate addresses, accessible to the communication interface to determine whether the wireless beacon is recognized and to identify the alternate network address.

2. A method of routing call requests, the method comprising:
receiving at a wireless mobile communication device an identifier from a source over a first wireless connection; determining whether the identifier comprises a recognized identifier based on a look up table containing alternate addresses, accessible to the wireless mobile communication device; and communicating to a wireless switch, when the identifier comprises a recognized identifier, a request to forward voice communications to the wireless mobile communications device to an alternate communication device.

3. The method of claim 2, wherein the wireless mobile communication device is a cellular phone and wherein the request to forward voice communications is issued automatically.

4. The method of claim 2, wherein the wireless mobile communication device includes a transmitter that utilizes a universal mobile telecommunications system.

5. The method of claim 2, wherein the wireless mobile communication device utilizes General Packet Radio Service.

6. The method of claim 2, wherein the wireless mobile communication device receives the identifier using a Bluetooth receiver.

7. The method of claim 2, wherein the source is proximal to the wireless mobile communication device.

8. The method of claim 2, further comprising determining to withdraw the request to forward voice communication.

9. The method of claim 8, wherein the request is withdrawn when the wireless mobile communication device no longer receives the identifier.

10. The method of claim 8, wherein the request is withdrawn in response to a user action.

11. The method of claim 10, wherein the user action is a key sequence.

12. The method of claim 10, wherein the user action is a voice request.

13. A system comprising:
a first wireless telephone configured to communicate using a wide area wireless protocol and configured to communicate using a proximal wireless protocol, the first wireless telephone including a call forward module and including a cancel call forward module, the call forward module including a table of alternate network addresses associated with recognized wireless beacon identifiers; and
a first wireless beacon device associated with a first alternate network address and configured to communicate with the first wireless telephone using the proximal wireless protocol, the call forward module of the first wireless telephone configured to send a first call forward message using the wide area wireless protocol when the first wireless telephone receives a recognized first wireless beacon identifier of the first wireless beacon, the first call forward message directing that calls addressed to the first wireless telephone be redirected to the first alternate network address associated with the first wireless beacon identifier.

14. The system of claim 13, wherein the cancel call forward module is configured to send a cancel call forward message using the wide area wireless protocol after detecting that the wireless telephone has moved out of range of the first wireless beacon.

15. The system of claim 13, further comprising a second wireless telephone, the second wireless telephone configured to communicate using the wide area wireless protocol and the proximal wireless protocol, the second wireless telephone including a table of alternate network addresses associated with recognized wireless beacon identifiers, the second wireless telephone configured to send a second call forward message after receiving the recognized first wireless beacon identifier.

16. The system of claim 13, further comprising a second wireless beacon having a second wireless beacon identifier associated with a second alternate network address, the second wireless beacon configured to communicate with the first wireless telephone using the proximal wireless protocol, the call forward module of the first wireless telephone configured to send a second call forward message using the wide area wireless protocol when the first wireless telephone receives the second wireless beacon identifier, the second call forward message directing that calls addressed to the first wireless telephone be directed to the second alternate network address.

17. The system of claim 1, wherein the mobile telephone comprises a multi-mode phone capable of communicating via a wireline network and the alternate network address is a network address of the mobile telephone on the wireline network.

18. The system of claim 1, further comprising a device associated with the alternate network address capable of receiving forwarded calls and capable of providing a distinctive notification of receipt of a forwarded call.

19. The system of claim 13, wherein the first wireless telephone is a multi-mode telephone capable of communicating via a wireline network and the first alternate network address is a network address of the first wireless telephone on the wireline network.

20. The system of claim 13, wherein the first wireless beacon identifier comprises a user selected identifier.

21. The system of claim 13, wherein the first wireless beacon is further configured to request a recognized user password before sending the first wireless beacon identifier.

22. The system of claim 15, further comprising a device associated with the first alternate network address capable of receiving forwarded calls and capable of providing a first distinctive notification of receipt of a first call redirected from the first wireless telephone and a second distinctive notification of receipt of a second call redirected from the second wireless telephone.

* * * * *